(12) United States Patent
Kauffmann

(10) Patent No.: US 11,625,101 B2
(45) Date of Patent: Apr. 11, 2023

(54) METHODS AND SYSTEMS FOR IDENTIFYING THREE-DIMENSIONAL-HUMAN-GESTURE INPUT

(71) Applicant: Google LLC, Mountain View, CA (US)

(72) Inventor: Alejandro Kauffmann, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 28 days.

(21) Appl. No.: 16/981,032

(22) PCT Filed: May 29, 2019

(86) PCT No.: PCT/US2019/034319
§ 371 (c)(1),
(2) Date: Sep. 15, 2020

(87) PCT Pub. No.: WO2019/232000
PCT Pub. Date: Dec. 5, 2019

(65) Prior Publication Data
US 2021/0096650 A1 Apr. 1, 2021

Related U.S. Application Data

(60) Provisional application No. 62/678,240, filed on May 30, 2018.

(51) Int. Cl.
*G06F 3/01* (2006.01)
(52) U.S. Cl.
CPC ................................. *G06F 3/017* (2013.01)

(58) Field of Classification Search
None
See application file for complete search history.

(56) References Cited

U.S. PATENT DOCUMENTS

| | | | |
|---|---|---|---|
| 2006/0287084 A1* | 12/2006 | Mao | A63F 13/211 463/37 |
| 2014/0282275 A1 | 9/2014 | Everitt et al. | |
| 2015/0261301 A1* | 9/2015 | Hagiwara | G06F 40/232 715/268 |

FOREIGN PATENT DOCUMENTS

WO  WO 2015/105919  7/2015

OTHER PUBLICATIONS

International Search Report for PCT/US2019/034319, dated Aug. 12, 2019, 2 pages.
(Continued)

*Primary Examiner* — Parul H Gupta
(74) *Attorney, Agent, or Firm* — Dority & Manning, P.A.

(57) ABSTRACT

The present disclosure is directed to identifying three-dimensional-human-gesture input. In particular, the methods and systems of the present disclosure can: receive from one or more sensors, data describing one or more three-dimensional motions comprising a three-dimensional-human-gesture input; generate, based at least in part on the data describing the one or more three-dimensional motions, two-dimensional data at least partially describing at least one motion of the one or more three-dimensional motions; and identify, based at least in part on the two-dimensional data, the three-dimensional-human-gesture input.

15 Claims, 9 Drawing Sheets

(56) References Cited

OTHER PUBLICATIONS

LG Owners Manual, "Magic Remote", 2017, https://www.lg.com/us/support/product/lg-AN-MR650A.AUS, retrieved on Nov. 10, 2022, 9 pages.
Mahoney et al., "Nonlinear Complementary Filters on the Special Orthogonal Group" IEEE Transactions on automatic control, vol. 53, No. 5, 2008, pp. 1203-1218.
The Wand Company, "Kymera Magic Wand Universal Remote Control", 2014, https://www.thewandcompany.eom/wp-content/uploads/2015/09/ENGLISH-manual-wrc10209-EN-v16-2014-LOWRES.pdf, 1 page.
Wobbrock et al., "Gestures without Libraries, Toolkits or Training: A $1 Recognizer for User Interface Prototypes", Proceedings of the 20th annual ACM symposium on User interface software and technology, 2007, pp. 159-168.

\* cited by examiner

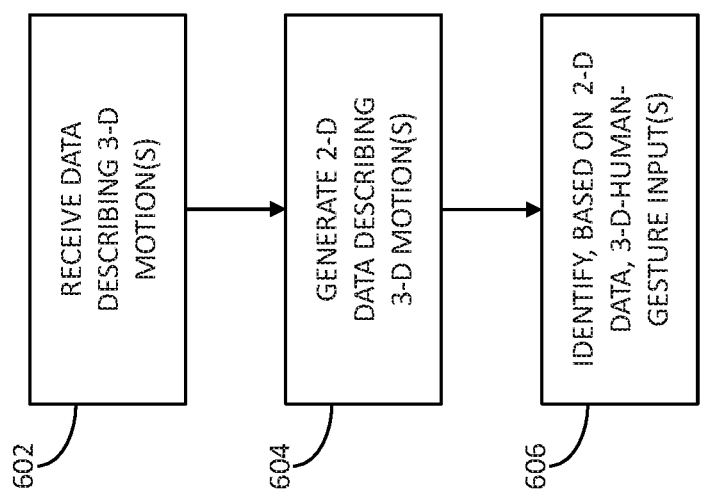

METHODS AND SYSTEMS FOR IDENTIFYING THREE-DIMENSIONAL-HUMAN-GESTURE INPUT

PRIORITY CLAIM

This application is based upon and claims the right of priority under 35 U.S.C. § 371 to International Application No. PCT/US2019/034319, filed May 29, 2019, which claims the benefit of U.S. Provisional Patent Application Ser. No. 62/678,240, filed May 30, 2018, and entitled "METHODS AND SYSTEMS FOR IDENTIFYING THREE-DIMENSIONAL-HUMAN-GESTURE INPUT." Applicant claims priority to and the benefit of each of such applications and incorporates all such applications by reference herein in their entirety.

FIELD

The present disclosure relates generally to human-computer interaction. More particularly, the present disclosure relates to identifying three-dimensional-human-gesture input.

BACKGROUND

Computing devices (e.g., smartphones, and/or the like) can provide (e.g., display on a display screen, and/or the like) a user interface that enables the computing device to interact with a user, including, for example, receipt of commands from the user, providing (e.g., displaying, and/or the like) information to the user, and/or the like. Some computing devices allow for gesture based inputs. Such devices can detect a gesture and provide an appropriate response. Traditional gesture-recognition techniques are complex and may be ineffective at recognizing gestures in situations where variability may exist. For example, such systems may have difficulty detecting gestures from different users, from different viewpoints, due to external conditions, and/or the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices and from one or more sensors, data describing one or more three-dimensional motions comprising a three-dimensional-human-gesture input. The method can also include generating, by the one or more computing devices and based at least in part on the data describing the one or more three-dimensional motions, two-dimensional data at least partially describing at least one motion of the one or more three-dimensional motions. The method can further include identifying, by the one or more computing devices and based at least in part on the two-dimensional data, the three-dimensional-human-gesture input.

Another example aspect of the present disclosure is directed to a system. The system can include one or more processors and a memory storing instructions that when executed by the one or more processors cause the system to perform operations. The operations can include generating, based at least in part on data describing one or more three-dimensional motions, two-dimensional data at least partially describing at least one motion of the one or more three-dimensional motions. The operations can also include identifying, based at least in part on the two-dimensional data, a three-dimensional-human-gesture input within the one or more three-dimensional motions.

A further example aspect of the present disclosure is directed to one or more non-transitory computer-readable media. The one or more non-transitory computer-readable media can comprise instructions that when executed by one or more computing devices cause the one or more computing devices to perform operations. The operations can include projecting, onto a two-dimensional plane, a representation of at least a portion of data describing one or more three-dimensional motions comprising a three-dimensional-human-gesture input. The operations can also include identifying, based at least in part on the representation, the three-dimensional-human-gesture input.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts an example method according to example embodiments of the present disclosure.

DETAILED DESCRIPTION

Example aspects of the present disclosure are directed to identifying three-dimensional-human-gesture input. For example, one or more computing devices can receive (e.g., from one or more sensors, and/or the like), data (e.g., three-dimensional data, and/or the like) describing one or more three-dimensional motions (e.g., of a user, object manipulated by such user, and/or the like) comprising a three-dimensional-human-gesture input. Based at least in part on the data describing the three-dimensional motion(s), the computing device(s) can generate two-dimensional data at least partially describing at least one motion of the three-dimensional motion(s). For example, in some embodiments, the computing device(s) can project a representation of at least a portion of the data describing the three-dimensional motion(s) onto a two-dimensional plane defined by each dimension of the two-dimensional data. Based at least in part on the two-dimensional data, the computing device(s) can identify the three-dimensional-human-gesture input.

The technology described herein can provide a number of technical effects and benefits, particularly in the area of computer technology. For example, the technology described herein can enable three-dimensional human-based inputs to be interpreted by computer systems using less complex two-dimensional-input-recognition techniques. The technology can provide for a conversion of three-dimensional input data to two-dimensional data that can be readily interpreted by computing systems. In this manner, suitable computing devices can be configured to interpret three-dimensional input data using two-dimensional recognition techniques. Additionally, the use of sensors that generate three-dimensional data can enable accurate detections of movements in three-dimensional space. Moreover, converting such data to two-dimensional data prior to gesture recognition can enable a processor to more accurately and easily interpret input data. Additionally, the technology described herein may enable certain computing devices that might otherwise been unable to do so (e.g., due to limited resources, and/or the like) to interpret three-dimensional human-based inputs within an appropriate response time, and/or the like.

With reference now to the Figures, example embodiments of the present disclosure will be discussed in further detail.

Figure 1:
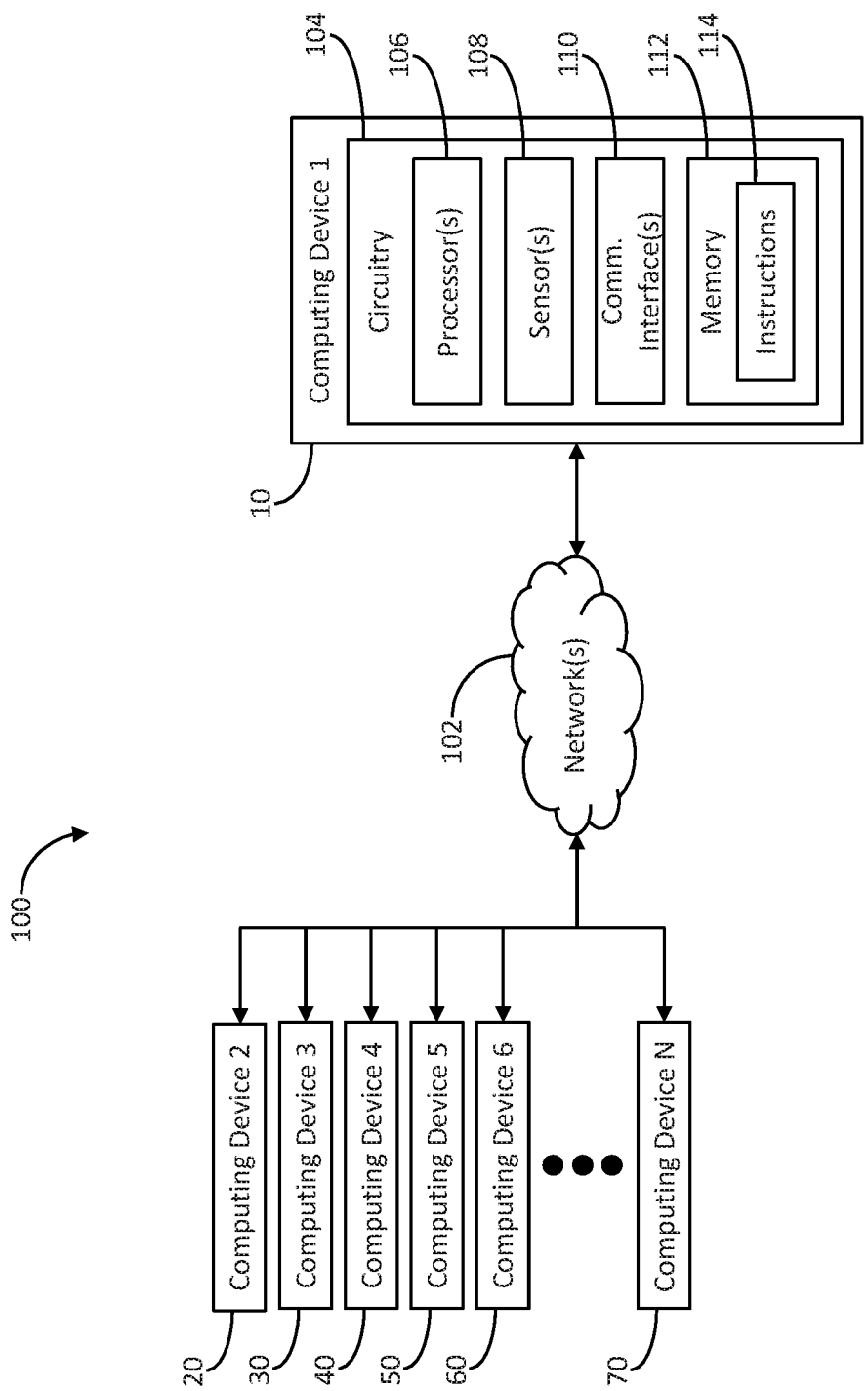
FIG. 1 depicts an example computing environment according to example embodiments of the present disclosure.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, servers, appliances, wearable devices, personal digital assistants, Internet of Things (IoT) devices, peripherals, user-input devices, and/or the like). For example, environment 100 can include computing devices 10, 20, 30, 40, 50, 60, and/or 70. In some embodiments, computing devices 10, 20, 30, 40, 50, 60, and/or 70 can be physically distinct from one another. Environment 100 can also include one or more networks 102 (e.g., one or more wired networks, wireless networks, and/or the like). Network(s) 102 can interface computing devices 10, 20, 30, 40, 50, 60, and/or 70 with one another.

Computing device 10 can include circuitry 104, which can comprise one or more processor(s) 106, one or more sensors 108, one or more communication interfaces 110, and memory 112 (e.g., one or more hardware components for storing executable instructions, data, and/or the like). Sensor(s) 108 can be configured to identify, describe, indicate, perceive, determine, and/or the like one or more variables, conditions, parameters, and/or the like of an environment of computing device 10. For example, sensor(s) 108 can include one or more global positioning system (GPS) receivers, wireless-network interfaces, altimeters, proximity sensors, ambient-light sensors, accelerometers, gyroscopes, compasses, barometers, cameras, inertial measurement unit (IMU) sensors, ultrasound sensors, radar sensors, and/or the like. Communication interface(s) 110 can enable computing device 10 to communicate with computing devices 20, 30, 40, 50, 60, and/or 70. Memory 112 can include (e.g., store, and/or the like) instructions 114. When executed by processor(s) 106, instructions 114 can cause computing device 10 to perform one or more operations, functions, and/or the like described herein. It will be appreciated that computing devices 20, 30, 40, 50, 60, and/or 70 can include one or more of the components described above with respect to computing device 10.

Unless explicitly indicated otherwise, the operations, functions, and/or the like described herein can be performed by computing devices 10, 20, 30, 40, 50, 60, and/or 70 (e.g., by one of computing devices 10, 20, 30, 40, 50, 60, or 70, by a combination of one or more of computing devices 10, 20, 30, 40, 50, 60, and/or 70, and/or the like).

FIGS. 2A-D depict example event sequences according to example embodiments of the present disclosure.

Figure 2A:
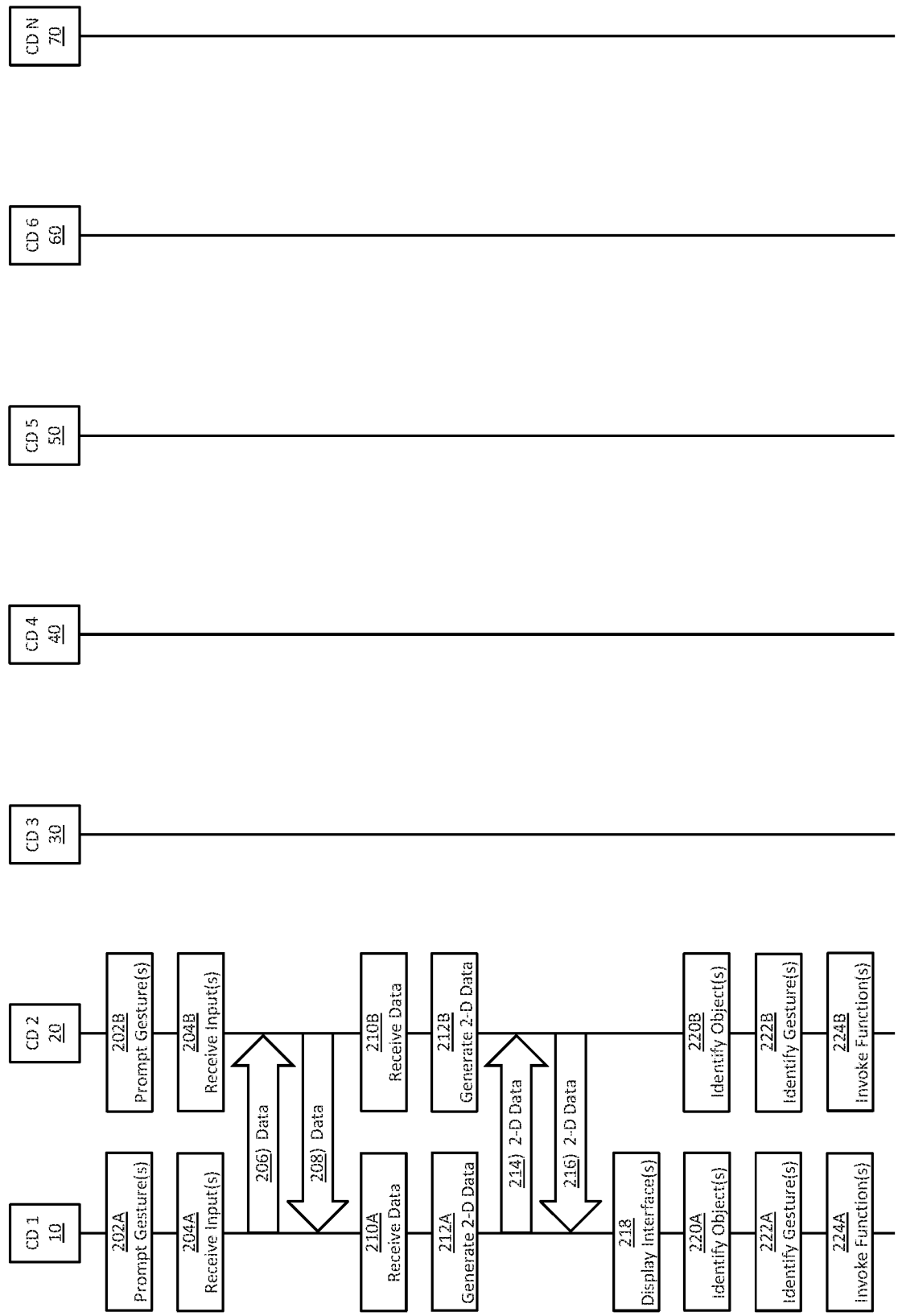
FIGS. 2A-D depict example event sequences according to example embodiments of the present disclosure.

Referring to FIG. 2A, at (202), a user can be prompted to provide one or more three-dimensional-human-gesture inputs. For example, at (202A), computing device 10 can prompt a user of computing devices 10, 20, 30, 40, 50, 60, and/or 70 to provide one or more three-dimensional-human-gesture inputs. Additionally or alternatively, at (202B), computing device 20 can prompt the user of computing devices 10, 20, 30, 40, 50, 60, and/or 70 to provide one or more three-dimensional-human-gesture inputs.

Figure 3:
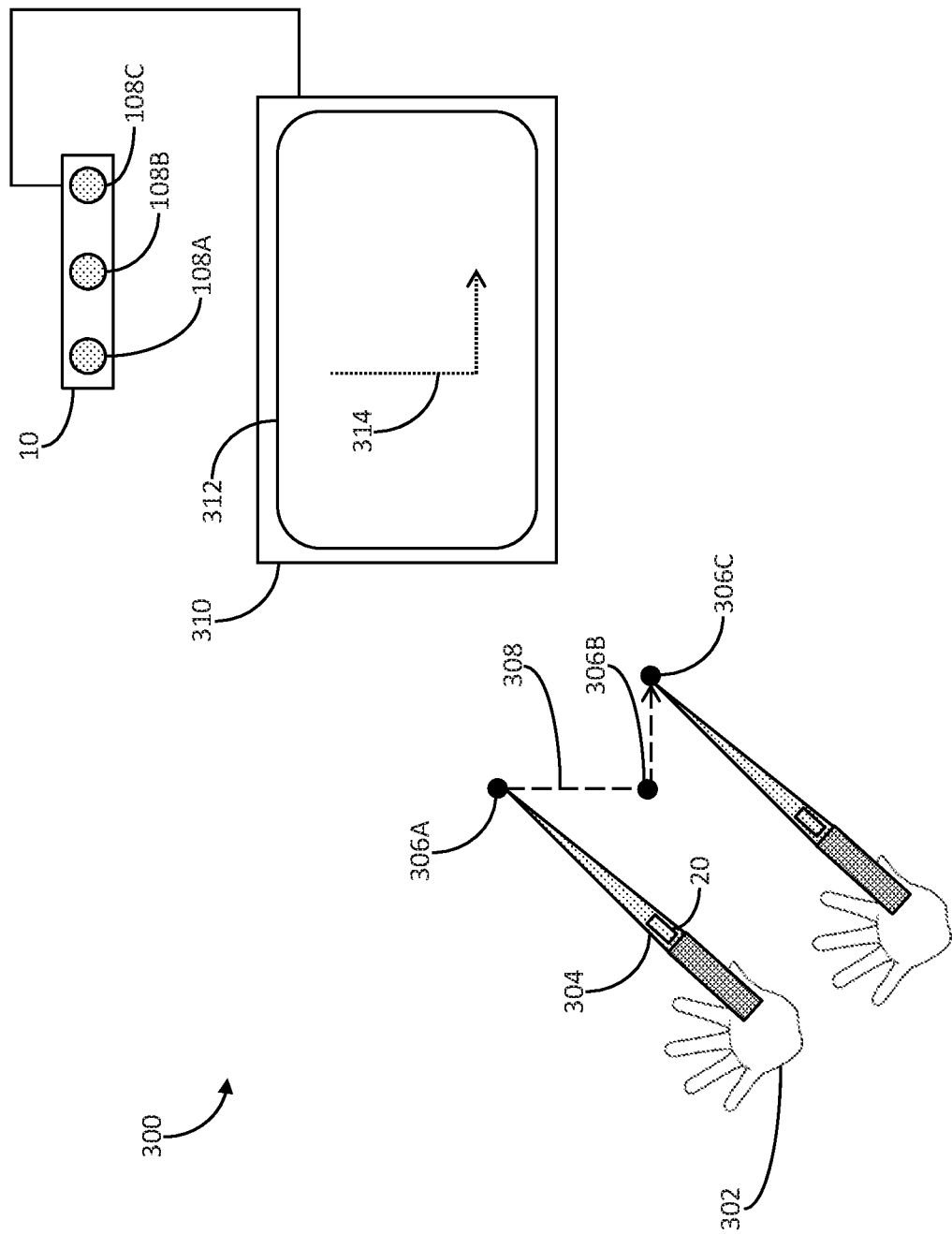
FIGS. 3-5 depict example scenes according to example embodiments of the present disclosure.

For example, FIG. 3 depicts an example scene according to example embodiments of the present disclosure. Referring to FIG. 3, scene 300 can include objects 302 and/or 304. A user can utilize object 302 (e.g., the user's hand, and/or the like) to hold object 304 (e.g., a magic wand, and/or the like). Object 304 can include computing device 20. Scene 300 can also include computing device 10. Computing device 10 can include sensors 108A, 108B, and/or 108C, which can, for example, be configured to monitor, track, and/or the like movements, positions, and/or the like of objects 302 and/or 304. Computing device 10 can include display device 310 for presenting one or more graphical interfaces for viewing by the user.

In some embodiments, the user can be prompted by computing device 10 to provide the three-dimensional-human-gesture input(s). For example, computing device 10 can generate data describing one or more graphical interfaces including one or more elements prompting the user to provide the three-dimensional-human-gesture input(s) and can communicate such data to display device 310, which can render the graphical interface(s) for viewing by the user, and/or the like. Additionally or alternatively, the user can be prompted by computing device 20 to provide the three-dimensional-human-gesture input(s). For example, computing device 20 can generate motion of object 304 (e.g., haptic feedback, and/or the like), which can prompt the user to provide the three-dimensional-human-gesture input(s).

The user can be prompted, for example, to provide one or more three-dimensional-human-gesture inputs characterized by manipulating, moving, repositioning, tilting, and/or the like object 304 (e.g., the tip of the wand, and/or the like) in accordance with trajectory 308 (e.g., from position 306A to position 306B, from position 306B to position 306C, and/or the like).

Returning to FIG. 2A, at (204), data describing one or more inputs to computing devices 10 and/or 20 can be received. The data can include data describing one or more three-dimensional motions (e.g., x coordinates, y coordinates, z coordinates, corresponding time stamps, and/or the like) comprising the three-dimensional-human-gesture input(s) (e.g., characterized by manipulating, moving, repositioning, tilting, and/or the like object 304 in accordance with trajectory 308, and/or the like). For example, at (204A), computing device 10 can receive data from sensors 108A, 108B, and/or 108C (e.g., one or more cameras, and/or the like) describing one or more three-dimensional motions of scene 300 (e.g., with respect to objects 302, 304, and/or the like) comprising the three-dimensional-human-gesture input(s). Additionally or alternatively, at (204B), computing device 20 can receive data from one or more sensors of computing device 20 (e.g., one or more IMU sensors, and/or the like) describing one or more three-dimensional motions of scene 300 (e.g., with respect to object 304, and/or the like) comprising the three-dimensional-human-gesture input(s). For example, the user (e.g., in response to the prompt(s), and/or the like) can have taken one or more actions (e.g., characterized by manipulating, moving, repositioning, tilting, and/or the like object 304 in accordance with trajectory 308, and/or the like) corresponding to the three-dimensional-human-gesture input(s), and computing devices 10 and/or 20 can receive data describing the three-dimensional motion(s) of scene 300, which can include the action(s) of the user.

At (206), computing device 10 can communicate (e.g., via network(s) 102, and/or the like) the data describing the three-dimensional motion(s) of scene 300 (e.g., the data received at (204A), and/or the like) to computing device 20. Similarly, at (208), computing device 20 can communicate (e.g., via network(s) 102, and/or the like) the data describing the three-dimensional motion(s) of scene 300 (e.g., the data received at (204B), and/or the like) to computing device 10. At (210), data describing the three-dimensional motion(s) can be received. For example, at (210A), computing device 10 can receive the data describing the three-dimensional motion(s) of scene 300 from computing device 20. Additionally or alternatively, at (210B), computing device 20 can receive the data describing the three-dimensional motion(s) of scene 300 from computing device 10.

At (212), two-dimensional data (e.g., x coordinates, y coordinates, corresponding time stamps, and/or the like) at least partially describing the three-dimensional motion(s) can be generated. For example, at (212A), computing device 10 can generate, for example, based at least in part on the data describing the three-dimensional motion(s) of scene 300 (e.g., the data received at (204A), (210A), and/or the like), two-dimensional data at least partially describing the three-dimensional motion(s) of scene 300. Additionally or alternatively, at (212B), computing device 20 can generate, for example, based at least in part on the data describing the three-dimensional motion(s) of scene 300 (e.g., the data received at (204B), (210B), and/or the like), two-dimensional data at least partially describing the three-dimensional motion(s) of scene 300. In some embodiments, generating the two-dimensional data can include projecting a representation of at least a portion of the data describing the three-dimensional motion(s) onto a two-dimensional plane defined by each dimension of the two-dimensional data.

At (214), computing device 10 can communicate (e.g., via network(s) 102, and/or the like) the two-dimensional data at least partially describing the three-dimensional motion(s) of scene 300 (e.g., the data generated at (212A), and/or the like) to computing device 20. Similarly, at (216), computing device 20 can communicate (e.g., via network(s) 102, and/or the like) the two-dimensional data at least partially describing the three-dimensional motion(s) of scene 300 (e.g., the data generated at (212B), and/or the like) to computing device 10.

At (218), computing device 10 can display one or more graphical interfaces comprising one or more elements depicting a representation of at least a portion of the data describing the three-dimensional motion(s) of scene 300. For example, referring to FIG. 3, computing device 10 can generate data describing one or more graphical interfaces 312 and can communicate such data to display device 310 for viewing by the user. Graphical interface(s) 312 can include one or more elements 314 depicting a representation of at least a portion of the data describing the three-dimensional motion(s) of scene 300. For example, as indicated above, in some embodiments, generating the two-dimensional data can include projecting a representation of at least a portion of the data describing the three-dimensional motion(s) onto a two-dimensional plane defined by each dimension of the two-dimensional data. In some of such embodiments, element(s) 314 can depict such a representation (e.g., a two-dimensional rendering of trajectory 308, and/or the like).

Returning to FIG. 2A, at (220), one or more objects included in the three-dimensional motion(s) can be identified. For example, at (220A), computing device 10 can identify, for example, based at least in part on the data describing the three-dimensional motion(s) of scene 300 (e.g., the data received at (204A), (204B), and/or the like), objects 302 and/or 304 within the three-dimensional motion(s) of scene 300. Additionally or alternatively, at (220B), computing device 20 can identify, for example, based at least in part on the data describing the three-dimensional motion(s) of scene 300 (e.g., the data received at (204A), (204B), and/or the like), objects 302 and/or 304 within the three-dimensional motion(s) of scene 300. In some embodiments, such object(s) can be identified from amongst a plurality of different predefined, distinct objects associated with a plurality of different predefined, distinct three-dimensional-human-gesture inputs.

At (222), the three-dimensional-human-gesture input(s) can be identified based at least in part on the two-dimensional data. For example, at (222A), computing device 10 can identify the three-dimensional-human-gesture input(s) (e.g., characterized by manipulating, moving, repositioning, tilting, and/or the like object 304 in accordance with trajectory 308, and/or the like) based at least in part on the two-dimensional data generated at (212A), (212B), and/or the like. Additionally or alternatively, at (222B), computing device 20 can identify the three-dimensional-human-gesture input(s) (e.g., characterized by manipulating, moving, repositioning, tilting, and/or the like object 304 in accordance with trajectory 308, and/or the like) based at least in part on the two-dimensional data generated at (212A), (212B), and/or the like.

In some embodiments, computing devices 10 and/or 20 can store data describing a plurality of different predefined, distinct three-dimensional-human-gesture inputs. Such data can include, for each particular three-dimensional-human-gesture input of the plurality of different predefined, distinct three-dimensional-human-gesture inputs, two-dimensional data describing one or more three-dimensional motions associated with the particular three-dimensional-human-gesture input. In some of such embodiments, computing devices 10 and/or 20 can identify the three-dimensional-human-gesture input(s) from amongst the plurality of different predefined, distinct three-dimensional-human-gesture inputs based at least in part on a correspondence between: at least a portion of the two-dimensional data at least partially describing the three-dimensional motion(s), and at least a portion of the data describing the plurality of different predefined, distinct three-dimensional-human-gesture inputs. In some embodiments, the portion of the data describing the plurality of different predefined, distinct three-dimensional-human-gesture inputs can be identified based at least in part on the identified object(s) included in the three-dimensional motion(s) (e.g., a search for corresponding data can be narrowed to data describing inputs associated with such object(s), and/or the like). In some embodiments, identifying the three-dimensional-human-gesture input(s) can include utilizing one or more two-dimensional-movement-recognition models (e.g., stroke-recognition algorithms, character-recognition algorithms, handwriting-recognition algorithms, and/or the like) to analyze at least a portion of the two-dimensional data (e.g., to identify one or more two-dimensional movements corresponding to the three-dimensional-human-gesture input(s), and/or the like). In some of such embodiments, one or more of such two-dimensional-movement-recognition model(s) can be preexisting (e.g., need not be reconfigured to identify the two-dimensional movement(s), and/or the like).

Responsive to identifying the three-dimensional-human-gesture input(s), at (224), one or more functions associated with the three-dimensional-human-gesture input(s) can be identified and invoked. For example, the three-dimensional-human-gesture input(s) (e.g., characterized by manipulating, moving, repositioning, tilting, and/or the like object 304 in accordance with trajectory 308, and/or the like) can be associated with one or more functions (e.g., casting a spell, and/or the like), for example, associated with an application (e.g., a game, and/or the like), and responsive to identifying the input(s), at (224A), computing device 10 can identify and invoke the associated function(s). Additionally or alternatively, responsive to identifying the input(s), at (224B), computing device 20 can identify and invoke the associated function(s).

Figure 4:
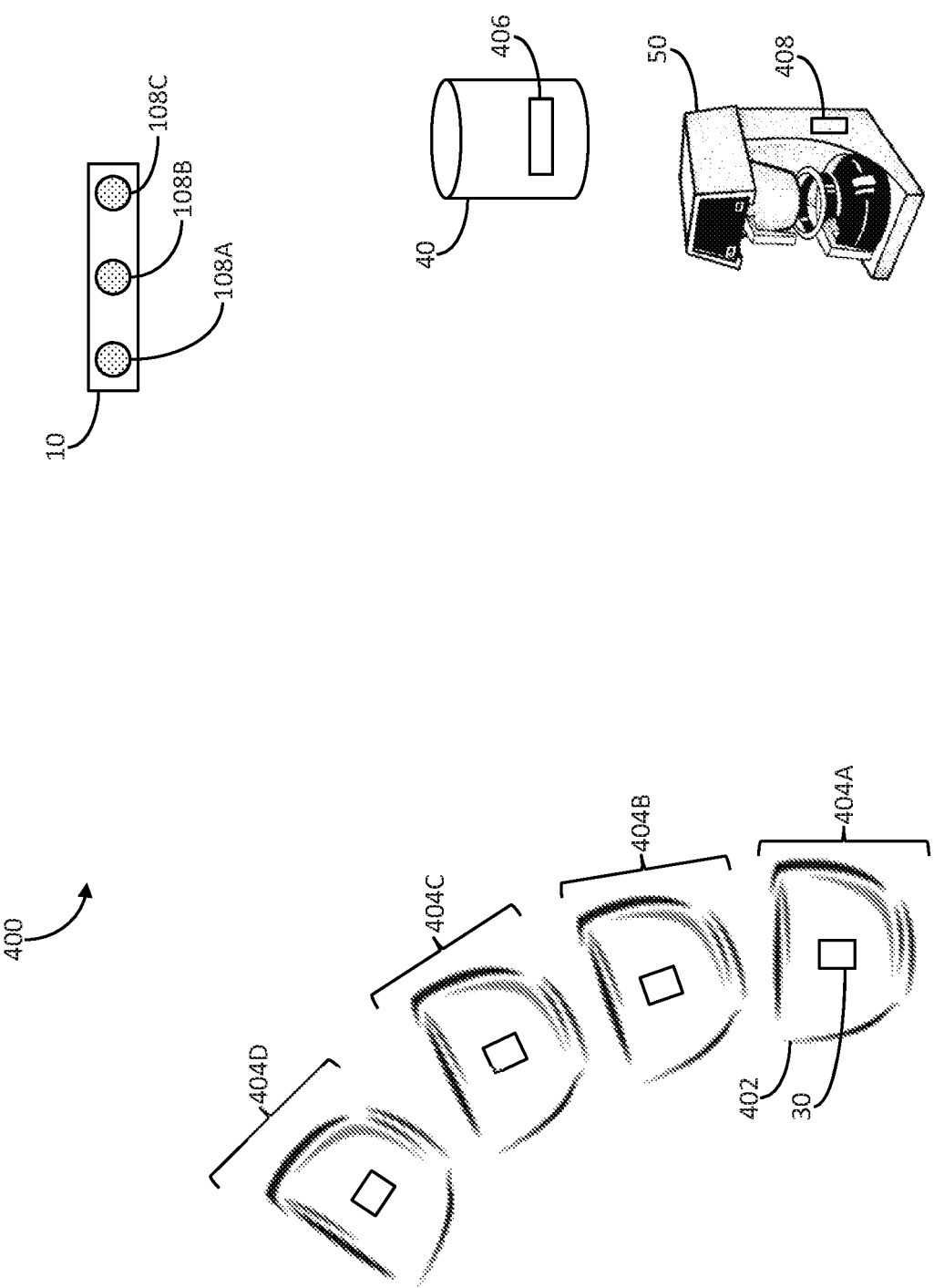

FIG. 4 depicts an example scene according to example embodiments of the present disclosure. Referring to FIG. 4, scene 400 can include object 402 (e.g., a coffee cup, and/or the like). Object 402 can include computing device 30. Scene 400 can also include computing devices 10, 40, and/or 50. Computing devices 10, 30, 40, and/or 50 can be of different types (e.g., computing device 30 can be a computing device comprising an IMU sensor embedded in a coffee cup, computing device 40 can be an audio-controlled personal-assistant device, computing device 50 can be a smart-appliance coffee maker, and/or the like). Computing device 40 can include sensor 406 (e.g., a microphone, and/or the like). Computing device 50 can include sensor 408 (e.g., configured to determine one or more statuses of the coffee maker, and/or the like).

One or more three-dimensional-human-gesture inputs can be characterized by manipulating, moving, repositioning, tilting, and/or the like object 402 (e.g., from position 404A to position 404B, from position 404B to position 404C, from position 404C to position 404D, and/or the like). For example, a three-dimensional-human-gesture input (e.g., associated with lifting a coffee cup, and/or the like) can be characterized by manipulating, moving, repositioning, tilting, and/or the like object 402 from position 404A to position 404B, and/or the like. Additionally or alternatively, a different three-dimensional-human-gesture input (e.g., associated with an empty coffee cup, and/or the like) can be characterized by manipulating, moving, repositioning, tilting, and/or the like object 402 from position 404C to position 404D, and/or the like.

The three-dimensional-human-gesture input (e.g., associated with lifting the coffee cup, and/or the like) characterized by manipulating, moving, repositioning, tilting, and/or the like object 402 from position 404A to position 404B, and/or the like can be associated with a function of computing device 40 (e.g., signaling the user has begun their morning routine, it is time for computing device 40 to read aloud the latest news updates, and/or the like). Similarly, the three-dimensional-human-gesture input (e.g., associated with an empty coffee cup, and/or the like) characterized by manipulating, moving, repositioning, tilting, and/or the like object 402 from position 404C to position 404D, and/or the like can be associated with a function of computing device 50 (e.g., signaling the user may desire additional coffee, computing device 50 should utilize sensor 408 to determine whether it should brew additional coffee, and/or the like).

Figure 2B:
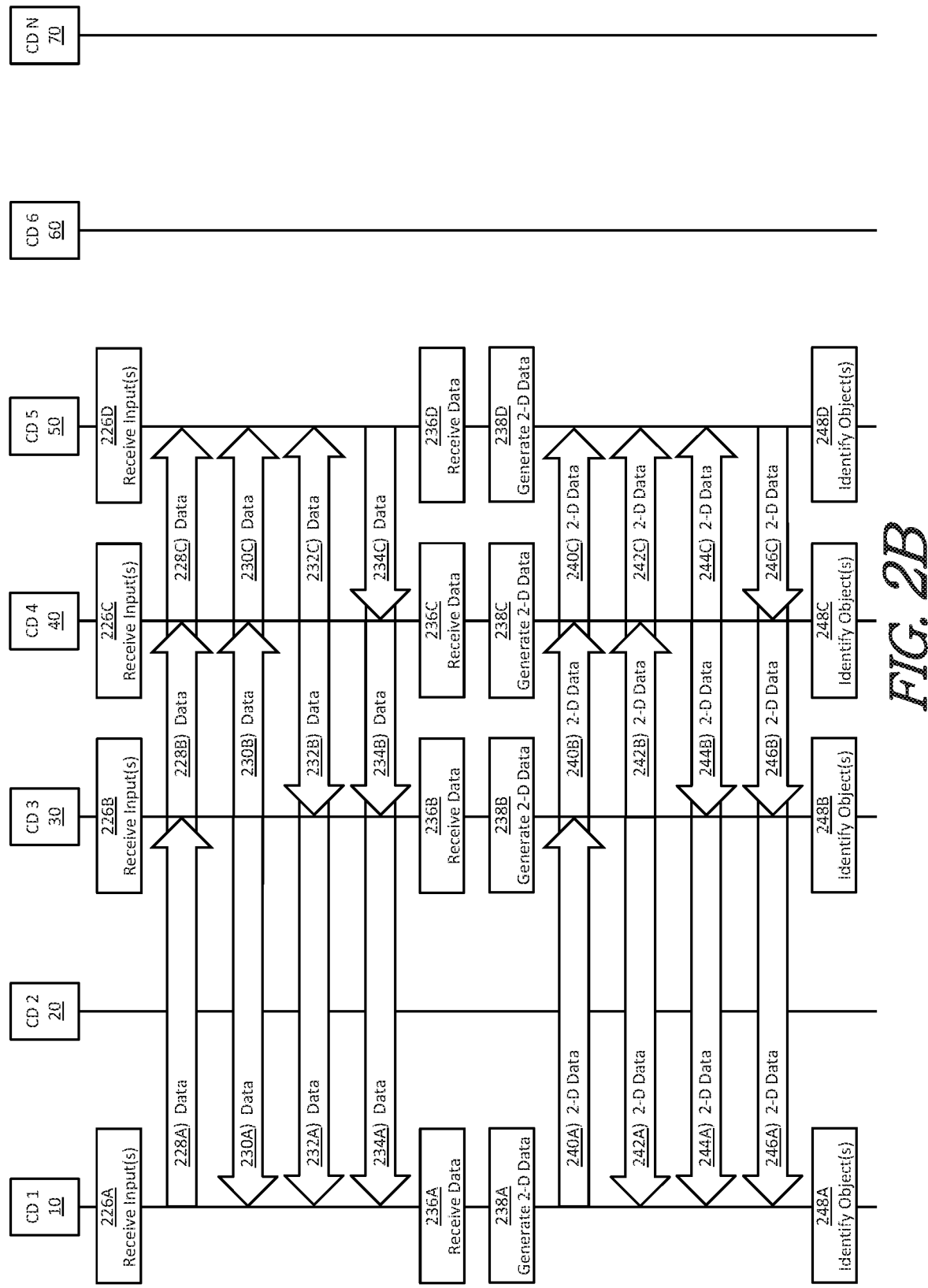

Referring to FIG. 2B, at (226), data describing one or more inputs to computing devices 10, 30, 40, and/or 50 can be received. The data can include data describing one or more three-dimensional motions (e.g., x coordinates, y coordinates, z coordinates, corresponding time stamps, and/or the like) comprising one or more three-dimensional-human-gesture inputs (e.g., characterized by manipulating, moving, repositioning, tilting, and/or the like object 402, and/or the like). For example, at (226A), computing device 10 can receive data from sensors 108A, 108B, and/or 108C (e.g., one or more cameras, and/or the like) describing one or more three-dimensional motions of scene 400 (e.g., with respect to object 402, and/or the like) comprising the three-dimensional-human-gesture input(s). Additionally or alternatively, at (226B), computing device 30 can receive data from one or more sensors of computing device 30 (e.g., one or more IMU sensors, and/or the like) describing one or more three-dimensional motions of scene 400 (e.g., with respect to object 402, and/or the like) comprising the three-dimensional-human-gesture input(s). Additionally or alternatively, at (226C), computing device 40 can receive data from one or more sensors of computing device 40 (e.g., a microphone, and/or the like). Additionally or alternatively, at (226D), computing device 50 can receive data from one or more sensors of computing device 50 (e.g., configured to determine one or more statuses of the coffee maker, and/or the like).

At (228), computing device 10 can communicate (e.g., via network(s) 102, and/or the like) data describing one or more of the input(s) associated with scene 400 (e.g., the data received at (226A), and/or the like) to computing device 30 (e.g., at (228A), and/or the like), computing device 40 (e.g., at (228B), and/or the like), and/or computing device 50 (e.g., at (228C), and/or the like). Similarly, at (230), computing device 30 can communicate (e.g., via network(s) 102, and/or the like) data describing one or more of the input(s) associated with scene 400 (e.g., the data received at (226B), and/or the like) to computing device 10 (e.g., at (230A), and/or the like), computing device 40 (e.g., at (230B), and/or the like), and/or computing device 50 (e.g., at (230C), and/or the like); at (232), computing device 40 can communicate (e.g., via network(s) 102, and/or the like) data describing one or more of the input(s) associated with scene 400 (e.g., the data received at (226C), and/or the like) to computing device 10 (e.g., at (232A), and/or the like), computing device 30 (e.g., at (232B), and/or the like), and/or computing device 50 (e.g., at (232C), and/or the like); and, at (234), computing device 50 can communicate (e.g., via network(s) 102, and/or the like) data describing one or more of the input(s) associated with scene 400 (e.g., the data received at (226D), and/or the like) to computing device 10 (e.g., at (234A), and/or the like), computing device 30 (e.g., at (234B), and/or the like), and/or computing device 40 (e.g., at (234C), and/or the like).

At (236), data describing the three-dimensional motion(s) can be received. For example, at (236A), computing device 10 can receive data describing the three-dimensional motion(s) of scene 400 from computing device(s) 30, 40, and/or 50. Additionally or alternatively, at (236B), computing device 30 can receive data describing the three-dimensional motion(s) of scene 400 from computing device(s) 10, 40, and/or 50. Additionally or alternatively, at (236C), computing device 40 can receive data describing the three-dimensional motion(s) of scene 400 from computing device(s) 10, 30, and/or 50. Additionally or alternatively, at (236D), computing device 50 can receive data describing the three-dimensional motion(s) of scene 400 from computing device(s) 10, 30, and/or 40.

At (238), two-dimensional data (e.g., x coordinates, y coordinates, corresponding time stamps, and/or the like) at least partially describing the three-dimensional motion(s) can be generated. For example, at (238A), computing device 10 can generate, for example, based at least in part on the data describing the three-dimensional motion(s) of scene 400 (e.g., the data received at (226A), (236A), and/or the like), two-dimensional data at least partially describing the three-dimensional motion(s) of scene 400. Additionally or alternatively, at (238B), computing device 30 can generate, for example, based at least in part on the data describing the three-dimensional motion(s) of scene 400 (e.g., the data received at (226B), (236B), and/or the like), two-dimensional data at least partially describing the three-dimensional motion(s) of scene 400. Additionally or alternatively, at (238C), computing device 40 can generate, for example, based at least in part on the data describing the three-dimensional motion(s) of scene 400 (e.g., the data received at (226C), (236C), and/or the like), two-dimensional data at least partially describing the three-dimensional motion(s) of scene 400. Additionally or alternatively, at (238D), computing device 50 can generate, for example, based at least in part on the data describing the three-dimensional motion(s) of scene 400 (e.g., the data received at (226D), (236D), and/or the like), two-dimensional data at least partially describing the three-dimensional motion(s) of scene 400.

At (240), computing device 10 can communicate (e.g., via network(s) 102, and/or the like) the two-dimensional data at least partially describing the three-dimensional motion(s) of scene 400 (e.g., the data generated at (238A), and/or the like) to computing device 30 (e.g., at (240A), and/or the like), computing device 40 (e.g., at (240B), and/or the like), and/or computing device 50 (e.g., at (240C), and/or the like). Similarly, at (242), computing device 30 can communicate (e.g., via network(s) 102, and/or the like) the two-dimensional data at least partially describing the three-dimensional motion(s) of scene 400 (e.g., the data generated at (238B), and/or the like) to computing device 10 (e.g., at (242A), and/or the like), computing device 40 (e.g., at (242B), and/or the like), and/or computing device 50 (e.g., at (242C), and/or the like); at (244), computing device 40 can communicate (e.g., via network(s) 102, and/or the like) the two-dimensional data at least partially describing the three-dimensional motion(s) of scene 400 (e.g., the data generated at (238C), and/or the like) to computing device 10 (e.g., at (244A), and/or the like), computing device 30 (e.g., at (244B), and/or the like), and/or computing device 50 (e.g., at (244C), and/or the like); and, at (246), computing device 50 can communicate (e.g., via network(s) 102, and/or the like) the two-dimensional data at least partially describing the three-dimensional motion(s) of scene 400 (e.g., the data generated at (238D), and/or the like) to computing device 10 (e.g., at (246A), and/or the like), computing device 30 (e.g., at (246B), and/or the like), and/or computing device 40 (e.g., at (246C), and/or the like).

At (248), one or more objects included in the three-dimensional motion(s) can be identified. For example, at (248A), computing device 10 can identify, for example, based at least in part on the data describing the three-dimensional motion(s) of scene 400 (e.g., the data received at (226A), (226B), (226C), (226D), and/or the like), object 402 within the three-dimensional motion(s) of scene 400. Additionally or alternatively, at (248B), computing device 30 can identify, for example, based at least in part on the data describing the three-dimensional motion(s) of scene 400 (e.g., the data received at (226A), (226B), (226C), (226D), and/or the like), object 402 within the three-dimensional motion(s) of scene 400. Additionally or alternatively, at (248C), computing device 40 can identify, for example, based at least in part on the data describing the three-dimensional motion(s) of scene 400 (e.g., the data received at (226A), (226B), (226C), (226D), and/or the like), object 402 within the three-dimensional motion(s) of scene 400. Additionally or alternatively, at (248D), computing device 50 can identify, for example, based at least in part on the data describing the three-dimensional motion(s) of scene 400 (e.g., the data received at (226A), (226B), (226C), (226D), and/or the like), object 402 within the three-dimensional motion(s) of scene 400.

Figure 2C:
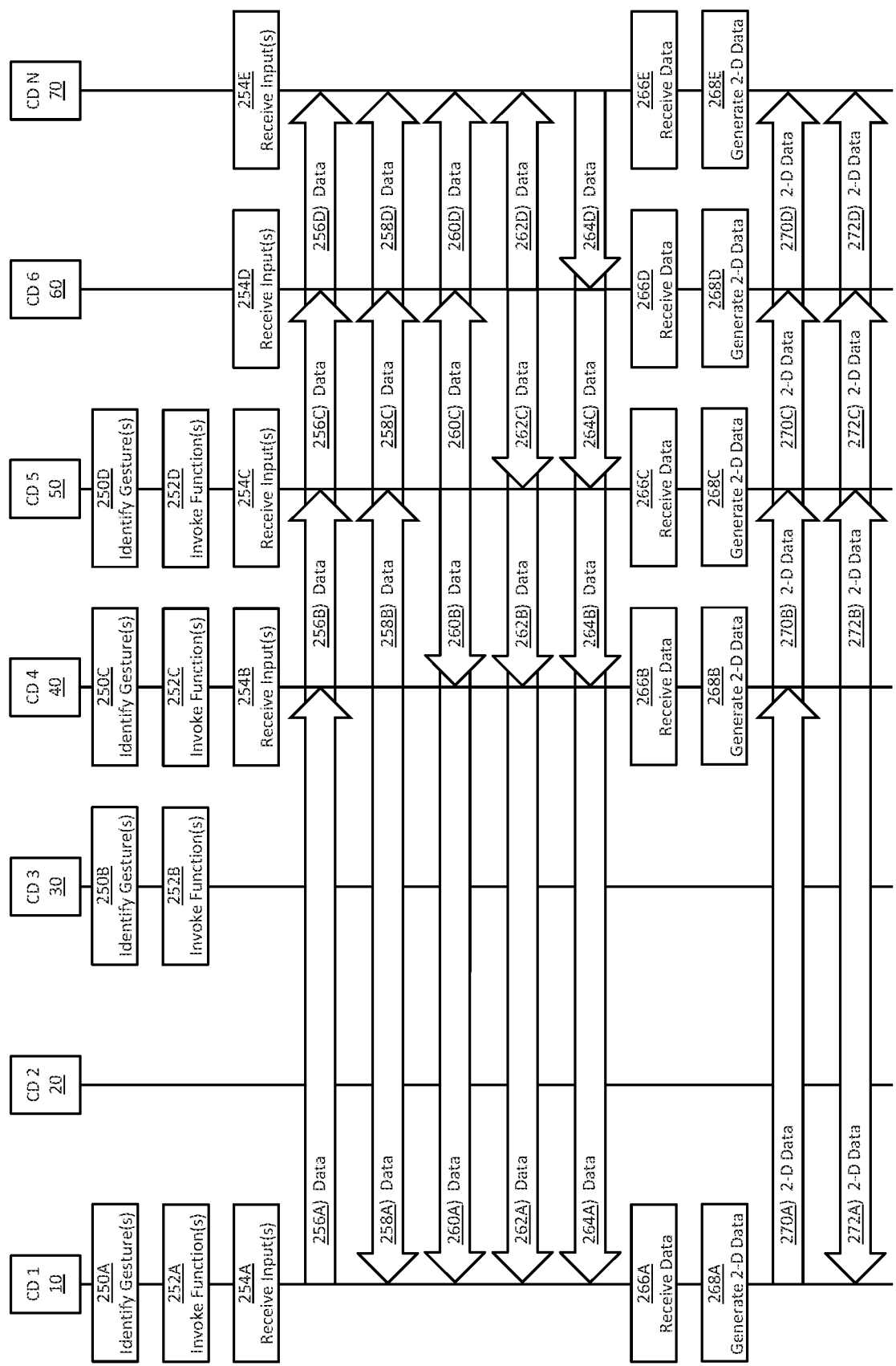
Figure 2D:
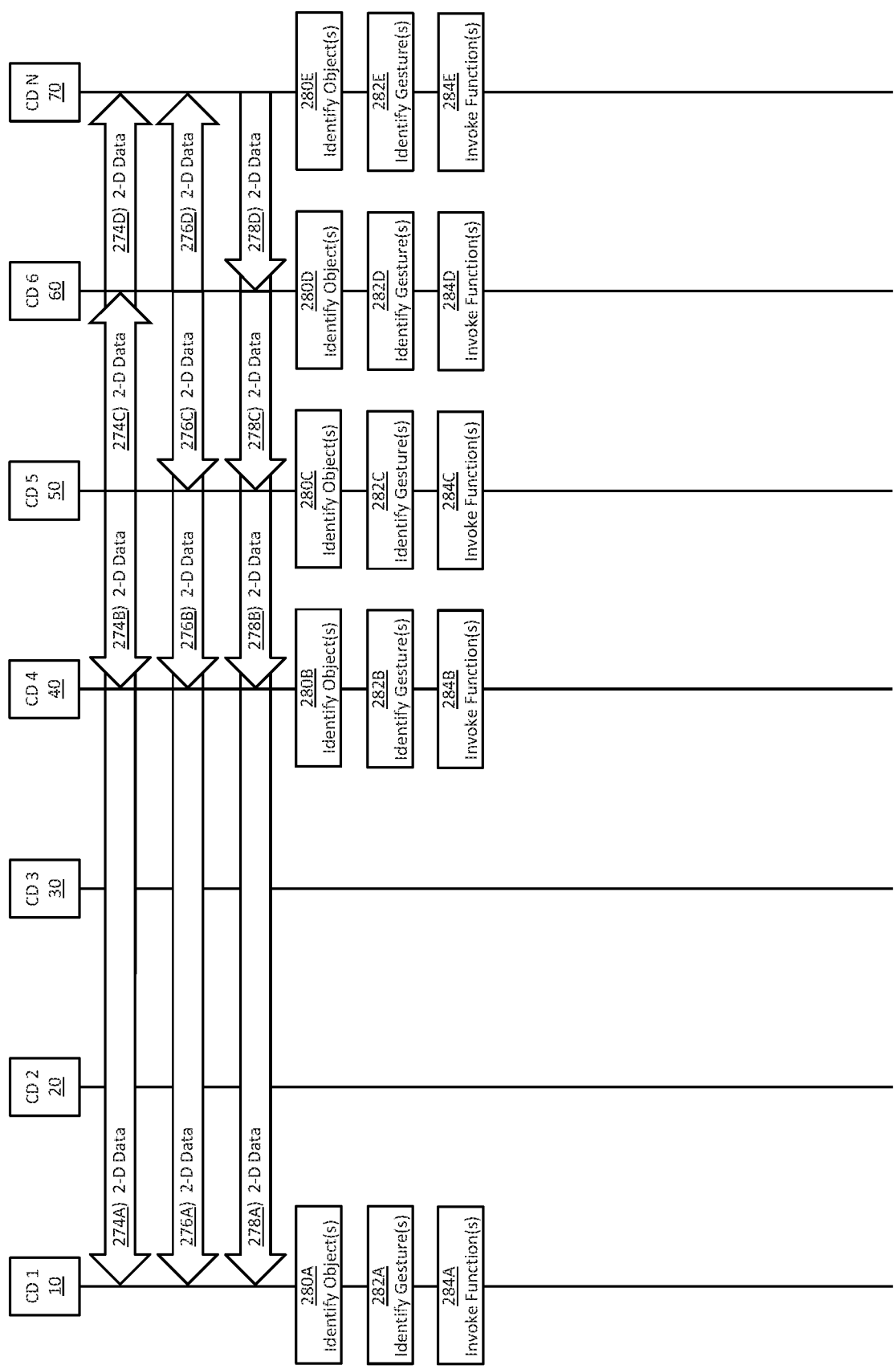

Referring to FIG. 2C, at (250), the three-dimensional-human-gesture input(s) can be identified based at least in part on the two-dimensional data. For example, at (250A), computing device 10 can identify the three-dimensional-human-gesture input(s) (e.g., characterized by manipulating, moving, repositioning, tilting, and/or the like object 402, and/or the like) based at least in part on the two-dimensional data generated at (238A), (238B), (238C), (238D), and/or the like. Additionally or alternatively, at (250B), computing device 30 can identify the three-dimensional-human-gesture input(s) (e.g., characterized by manipulating, moving, repositioning, tilting, and/or the like object 402, and/or the like) based at least in part on the two-dimensional data generated at (238A), (238B), (238C), (238D), and/or the like. Additionally or alternatively, at (250C), computing device 40 can identify the three-dimensional-human-gesture input(s) (e.g., characterized by manipulating, moving, repositioning, tilting, and/or the like object 402, and/or the like) based at least in part on the two-dimensional data generated at (238A), (238B), (238C), (238D), and/or the like. Additionally or alternatively, at (250D), computing device 50 can identify the three-dimensional-human-gesture input(s) (e.g., characterized by manipulating, moving, repositioning, tilting, and/or the like object 402, and/or the like) based at least in part on the two-dimensional data generated at (238A), (238B), (238C), (238D), and/or the like.

Responsive to identifying the three-dimensional-human-gesture input(s), at (252), one or more functions associated with the three-dimensional-human-gesture input(s) can be identified and invoked. For example, the three-dimensional-human-gesture input(s) (e.g., characterized by manipulating, moving, repositioning, tilting, and/or the like object 402, and/or the like) can be associated with one or more functions (e.g., signaling the user has begun their morning routine, it is time for computing device 40 to read aloud the latest news updates, signaling the user may desire additional coffee, computing device 50 should utilize sensor 408 to determine whether it should brew additional coffee, and/or the like), and responsive to identifying the input(s), at (252A), computing device 10 can identify and invoke the associated function(s). Additionally or alternatively, responsive to identifying the input(s), at (252B), computing device 30 can identify and invoke the associated function(s). Additionally or alternatively, responsive to identifying the input(s), at (252C), computing device 40 can identify and invoke the associated function(s). Additionally or alternatively, responsive to identifying the input(s), at (252D), computing device 50 can identify and invoke the associated function(s).

Figure 5:
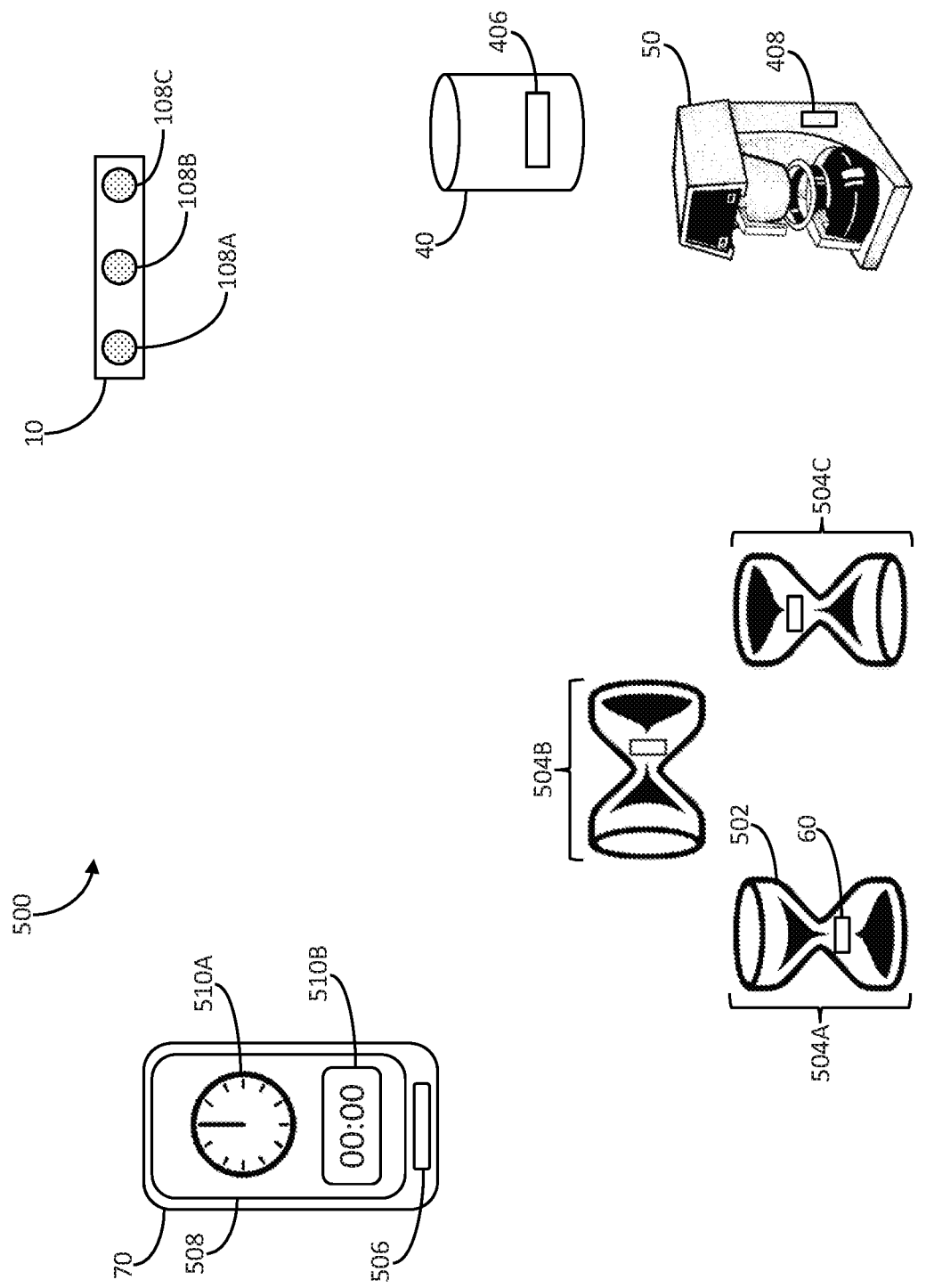

FIG. 5 depicts an example scene according to example embodiments of the present disclosure. Referring to FIG. 5, scene 500 can include object 502 (e.g., an hourglass, and/or the like). Object 502 can include computing device 60.

Scene 500 can also include computing devices 10, 40, 50, and/or 70. Computing device 70 can include sensor 506 (e.g., an accelerometer, and/or the like).

One or more three-dimensional-human-gesture inputs can be characterized by manipulating, moving, repositioning, tilting, and/or the like object 502 (e.g., from position 504A to position 504B, from position 504B to position 504C, and/or the like). The three-dimensional-human-gesture input (e.g., associated with flipping the hourglass, and/or the like) characterized by manipulating, moving, repositioning, tilting, and/or the like object 502 from position 504A to position 504B, from position 504B to position 504C, and/or the like can be associated with multiple different functions. For example, the input can be associated with starting a timer of computing device 70 (e.g., the timer depicted by elements 510A and 510B of graphical interface 508 displayed by computing device 70, and/or the like), starting a timer of computing device 50, and/or the like.

Returning to FIG. 2C, at (254), data describing one or more inputs to computing devices 10, 40, 50, 60, and/or 70 can be received. The data can include data describing one or more three-dimensional motions (e.g., x coordinates, y coordinates, z coordinates, corresponding time stamps, and/or the like) comprising one or more three-dimensional-human-gesture inputs (e.g., characterized by manipulating, moving, repositioning, tilting, and/or the like object 502, and/or the like). For example, at (254A), computing device 10 can receive data from sensors 108A, 108B, and/or 108C (e.g., one or more cameras, and/or the like) describing one or more three-dimensional motions of scene 500 (e.g., with respect to object 502, and/or the like) comprising the three-dimensional-human-gesture input(s). Additionally or alternatively, at (254B), computing device 40 can receive data from one or more sensors of computing device 40 (e.g., a microphone, and/or the like). Additionally or alternatively, at (254C), computing device 50 can receive data from one or more sensors of computing device 50 (e.g., configured to determine one or more statuses of the coffee maker, and/or the like). Additionally or alternatively, at (254D), computing device 60 can receive data from one or more sensors of computing device 60 (e.g., one or more IMU sensors, and/or the like) describing one or more three-dimensional motions of scene 500 (e.g., with respect to object 502, and/or the like) comprising the three-dimensional-human-gesture input(s). Additionally or alternatively, at (254E), computing device 70 can receive data from one or more sensors of computing device 70.

At (256), computing device 10 can communicate (e.g., via network(s) 102, and/or the like) data describing one or more of the input(s) associated with scene 500 (e.g., the data received at (254A), and/or the like) to computing device 40 (e.g., at (256A), and/or the like), computing device 50 (e.g., at (256B), and/or the like), computing device 60 (e.g., at (256C), and/or the like), and/or computing device 70 (e.g., at (256D), and/or the like). Similarly, at (258), computing device 40 can communicate (e.g., via network(s) 102, and/or the like) data describing one or more of the input(s) associated with scene 500 (e.g., the data received at (254B), and/or the like) to computing device 10 (e.g., at (258A), and/or the like), computing device 50 (e.g., at (258B), and/or the like), computing device 60 (e.g., at (258C), and/or the like), and/or computing device 70 (e.g., at (258D), and/or the like); at (260), computing device 50 can communicate (e.g., via network(s) 102, and/or the like) data describing one or more of the input(s) associated with scene 500 (e.g., the data received at (254C), and/or the like) to computing device 10 (e.g., at (260A), and/or the like), computing device 40 (e.g., at (260B), and/or the like), computing device 60 (e.g., at (260C), and/or the like), and/or computing device 70 (e.g., at (260D), and/or the like); at (262), computing device 60 can communicate (e.g., via network(s) 102, and/or the like) data describing one or more of the input(s) associated with scene 500 (e.g., the data received at (254D), and/or the like) to computing device 10 (e.g., at (262A), and/or the like), computing device 40 (e.g., at (262B), and/or the like), computing device 50 (e.g., at (262C), and/or the like), and/or computing device 70 (e.g., at (262D), and/or the like); and, at (264), computing device 70 can communicate (e.g., via network(s) 102, and/or the like) data describing one or more of the input(s) associated with scene 500 (e.g., the data received at (254E), and/or the like) to computing device 10 (e.g., at (264A), and/or the like), computing device 40 (e.g., at (264B), and/or the like), computing device 50 (e.g., at (264C), and/or the like), and/or computing device 60 (e.g., at (264D), and/or the like).

At (266), data describing the three-dimensional motion(s) can be received. For example, at (266A), computing device 10 can receive data describing the three-dimensional motion(s) of scene 500 from computing device(s) 40, 50, 60, and/or 70. Additionally or alternatively, at (266B), computing device 40 can receive data describing the three-dimensional motion(s) of scene 500 from computing device(s) 10, 50, 60, and/or 70. Additionally or alternatively, at (266C), computing device 50 can receive data describing the three-dimensional motion(s) of scene 500 from computing device(s) 10, 40, 60, and/or 70. Additionally or alternatively, at (266D), computing device 60 can receive data describing the three-dimensional motion(s) of scene 500 from computing device(s) 10, 40, 50, and/or 70. Additionally or alternatively, at (266E), computing device 70 can receive data describing the three-dimensional motion(s) of scene 500 from computing device(s) 10, 40, 50, and/or 60.

At (268), two-dimensional data (e.g., x coordinates, y coordinates, corresponding time stamps, and/or the like) at least partially describing the three-dimensional motion(s) can be generated. For example, at (268A), computing device 10 can generate, for example, based at least in part on the data describing the three-dimensional motion(s) of scene 500 (e.g., the data received at (254A), (266A), and/or the like), two-dimensional data at least partially describing the three-dimensional motion(s) of scene 500. Additionally or alternatively, at (268B), computing device 40 can generate, for example, based at least in part on the data describing the three-dimensional motion(s) of scene 500 (e.g., the data received at (254B), (266B), and/or the like), two-dimensional data at least partially describing the three-dimensional motion(s) of scene 500. Additionally or alternatively, at (268C), computing device 50 can generate, for example, based at least in part on the data describing the three-dimensional motion(s) of scene 500 (e.g., the data received at (254C), (266C), and/or the like), two-dimensional data at least partially describing the three-dimensional motion(s) of scene 500. Additionally or alternatively, at (268D), computing device 60 can generate, for example, based at least in part on the data describing the three-dimensional motion(s) of scene 500 (e.g., the data received at (254D), (266D), and/or the like), two-dimensional data at least partially describing the three-dimensional motion(s) of scene 500. Additionally or alternatively, at (268E), computing device 70 can generate, for example, based at least in part on the data describing the three-dimensional motion(s) of scene 500 (e.g., the data received at (254E), (266E), and/or the like), two-dimensional data at least partially describing the three-dimensional motion(s) of scene 500.

At (270), computing device 10 can communicate (e.g., via network(s) 102, and/or the like) the two-dimensional data at least partially describing the three-dimensional motion(s) of scene 500 (e.g., the data generated at (268A), and/or the like) to computing device 40 (e.g., at (270A), and/or the like), computing device 50 (e.g., at (270B), and/or the like), computing device 60 (e.g., at (270C), and/or the like), and/or computing device 70 (e.g., at (270D), and/or the like). Similarly, at (272), computing device 40 can communicate (e.g., via network(s) 102, and/or the like) the two-dimensional data at least partially describing the three-dimensional motion(s) of scene 500 (e.g., the data generated at (268B), and/or the like) to computing device 10 (e.g., at (272A), and/or the like), computing device 50 (e.g., at (272B), and/or the like), computing device 60 (e.g., at (272C), and/or the like), and/or computing device 70 (e.g., at (272D), and/or the like); referring to FIG. 2D, at (274), computing device 50 can communicate (e.g., via network(s) 102, and/or the like) the two-dimensional data at least partially describing the three-dimensional motion(s) of scene 500 (e.g., the data generated at (268C), and/or the like) to computing device 10 (e.g., at (274A), and/or the like), computing device 40 (e.g., at (274B), and/or the like), computing device 60 (e.g., at (274C), and/or the like), and/or computing device 70 (e.g., at (274D), and/or the like); at (276), computing device 60 can communicate (e.g., via network(s) 102, and/or the like) the two-dimensional data at least partially describing the three-dimensional motion(s) of scene 500 (e.g., the data generated at (268D), and/or the like) to computing device 10 (e.g., at (276A), and/or the like), computing device 40 (e.g., at (276B), and/or the like), computing device 50 (e.g., at (276C), and/or the like), and/or computing device 70 (e.g., at (276D), and/or the like); and, at (278), computing device 70 can communicate (e.g., via network(s) 102, and/or the like) the two-dimensional data at least partially describing the three-dimensional motion(s) of scene 500 (e.g., the data generated at (268E), and/or the like) to computing device 10 (e.g., at (278A), and/or the like), computing device 40 (e.g., at (278B), and/or the like), computing device 50 (e.g., at (278C), and/or the like), and/or computing device 60 (e.g., at (278D), and/or the like).

At (280), one or more objects included in the three-dimensional motion(s) can be identified. For example, at (280A), computing device 10 can identify, for example, based at least in part on the data describing the three-dimensional motion(s) of scene 500 (e.g., the data received at (254A), (254B), (254C), (254D), (254E), and/or the like), object 502 within the three-dimensional motion(s) of scene 500. Additionally or alternatively, at (280B), computing device 40 can identify, for example, based at least in part on the data describing the three-dimensional motion(s) of scene 500 (e.g., the data received at (254A), (254B), (254C), (254D), (254E), and/or the like), object 502 within the three-dimensional motion(s) of scene 500. Additionally or alternatively, at (280C), computing device 50 can identify, for example, based at least in part on the data describing the three-dimensional motion(s) of scene 500 (e.g., the data received at (254A), (254B), (254C), (254D), (254E), and/or the like), object 502 within the three-dimensional motion(s) of scene 500. Additionally or alternatively, at (280D), computing device 60 can identify, for example, based at least in part on the data describing the three-dimensional motion(s) of scene 500 (e.g., the data received at (254A), (254B), (254C), (254D), (254E), and/or the like), object 502 within the three-dimensional motion(s) of scene 500. Additionally or alternatively, at (280E), computing device 70 can identify, for example, based at least in part on the data describing the three-dimensional motion(s) of scene 500 (e.g., the data received at (254A), (254B), (254C), (254D), (254E), and/or the like), object 502 within the three-dimensional motion(s) of scene 500.

At (282), the three-dimensional-human-gesture input(s) can be identified based at least in part on the two-dimensional data. For example, at (282A), computing device 10 can identify the three-dimensional-human-gesture input(s) (e.g., characterized by manipulating, moving, repositioning, tilting, and/or the like object 502, and/or the like) based at least in part on the two-dimensional data generated at (268A), (268B), (268C), (268D), (268E), and/or the like. Additionally or alternatively, at (282B), computing device 40 can identify the three-dimensional-human-gesture input(s) (e.g., characterized by manipulating, moving, repositioning, tilting, and/or the like object 502, and/or the like) based at least in part on the two-dimensional data generated at (268A), (268B), (268C), (268D), (268E), and/or the like. Additionally or alternatively, at (282C), computing device 50 can identify the three-dimensional-human-gesture input(s) (e.g., characterized by manipulating, moving, repositioning, tilting, and/or the like object 502, and/or the like) based at least in part on the two-dimensional data generated at (268A), (268B), (268C), (268D), (268E), and/or the like. Additionally or alternatively, at (282D), computing device 60 can identify the three-dimensional-human-gesture input(s) (e.g., characterized by manipulating, moving, repositioning, tilting, and/or the like object 502, and/or the like) based at least in part on the two-dimensional data generated at (268A), (268B), (268C), (268D), (268E), and/or the like. Additionally or alternatively, at (282E), computing device 70 can identify the three-dimensional-human-gesture input(s) (e.g., characterized by manipulating, moving, repositioning, tilting, and/or the like object 502, and/or the like) based at least in part on the two-dimensional data generated at (268A), (268B), (268C), (268D), (268E), and/or the like.

Responsive to identifying the three-dimensional-human-gesture input(s), at (284), one or more functions associated with the three-dimensional-human-gesture input(s) can be identified and invoked. For example, the three-dimensional-human-gesture input(s) (e.g., characterized by manipulating, moving, repositioning, tilting, and/or the like object 502, and/or the like) can be associated with one or more functions (e.g., starting the timer of computing device 50, starting the timer of computing device 70, and/or the like), and responsive to identifying the input(s), at (284A), computing device 10 can identify and invoke the associated function(s). Additionally or alternatively, responsive to identifying the input(s), at (284B), computing device 40 can identify and invoke the associated function(s). Additionally or alternatively, responsive to identifying the input(s), at (284C), computing device 50 can identify and invoke the associated function(s). Additionally or alternatively, responsive to identifying the input(s), at (284D), computing device 60 can identify and invoke the associated function(s). Additionally or alternatively, responsive to identifying the input(s), at (284E), computing device 70 can identify and invoke the associated function(s).

FIG. 6 depicts an example method according to example embodiments of the present disclosure.

Referring to FIG. 6, at (602), one or more computing devices can receive data describing one or more three-dimensional motions comprising a three-dimensional-human-gesture input (e.g., as described above with respect to (210), (236), (266), and/or the like). As previously indicated, in some embodiments, one or more of such three-dimensional motion(s) can include one or more three-dimensional motions of one or more objects (e.g., one or more body parts of a user, one or more objects manipulated by a user, and/or the like).

At (604), the computing device(s) can generate, based at least in part on the data describing the three-dimensional motion(s), two-dimensional data at least partially describing at least one motion of the three-dimensional motion(s) (e.g., as described above with respect to (212), (238), (268), and/or the like).

At (606), the computing device(s) can identify, based at least in part on the two-dimensional data, the three-dimensional-human-gesture input (e.g., as described above with respect to (222), (250), (282), and/or the like).

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one of ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a further embodiment. Thus, it is intended that the present disclosure cover such alterations, variations, and/or equivalents.

What is claimed is:

1. A computer-implemented method comprising:
   generating, by one or more inertial measurement sensors of a hand-held object, three-dimensional data describing one or more three-dimensional motions comprising a three-dimensional-human-gesture input;
   generating, by one or more processors of the hand-held object and based at least in part on the three-dimensional data describing the one or more three-dimensional motions, two-dimensional data at least partially describing at least one motion of the one or more three-dimensional motions;
   transmitting, by the one or more processors of the hand-held object, the two-dimensional data from the hand-held object to one or more computing devices remote from the hand-held object; and
   identifying, by the one or more computing devices and based at least in part on the two-dimensional data, the three-dimensional-human-gesture input, wherein identifying the three-dimensional-human-gesture input comprises:
     identifying, based at least in part on the two-dimensional data and one or more two-dimensional-movement-recognition models, a two-dimensional movement; and
     identifying, based at least in part on the two-dimensional movement, the three-dimensional-human-gesture input.

2. The computer-implemented method of claim 1, wherein generating the two-dimensional data comprises projecting a representation of at least a portion of the data describing the one or more three-dimensional motions onto a two-dimensional plane defined by each dimension of the two-dimensional data.

3. The computer-implemented method of claim 2, wherein:
the one or more three-dimensional motions comprise one or more actions by a user; and
the method comprises:
generating, by the one or more computing devices, data describing one or more graphical interfaces comprising one or more elements depicting the representation of the at least a portion of the data describing the one or more three-dimensional motions; and
communicating, by the one or more computing devices and to a display device, the data describing the one or more graphical interfaces for viewing by the user.

4. The computer-implemented method of claim 1, wherein:
the one or more computing devices store data describing a plurality of different predefined, distinct three-dimensional-human-gesture inputs;
the data describing the plurality of different predefined, distinct three-dimensional-human-gesture inputs comprises, for each particular three-dimensional-human-gesture input of the plurality of different predefined, distinct three-dimensional-human-gesture inputs, two-dimensional data describing one or more three-dimensional motions associated with the particular three-dimensional-human-gesture input; and
identifying the three-dimensional-human-gesture input comprises identifying the three-dimensional-human-gesture input from amongst the plurality of different predefined, distinct three-dimensional-human-gesture inputs based at least in part on a correspondence between:
at least a portion of the two-dimensional data at least partially describing the at least one motion of the one or more three-dimensional motions, and
at least a portion of the data describing the plurality of different predefined, distinct three-dimensional-human-gesture inputs.

5. The computer-implemented method of claim 4, wherein:
the method comprises identifying, by the one or more computing devices, the hand-held object from amongst a plurality of different predefined, distinct objects associated with the plurality of different predefined, distinct three-dimensional-human-gesture inputs; and
identifying the three-dimensional-human-gesture input comprises identifying the at least a portion of the data describing the plurality of different predefined, distinct three-dimensional-human-gesture inputs based at least in part on the hand-held object.

6. The computer-implemented method of claim 1, comprising, responsive to identifying the three-dimensional-human-gesture input:
identifying, by the one or more computing devices, one or more functions associated with the three-dimensional-human-gesture input; and
invoking, by the one or more computing devices, the one or more functions.

7. The computer-implemented method of claim 1, wherein the hand-held object comprises one or more camera sensors.

8. The computer-implemented method of claim 1, wherein the hand-held object comprises at least one of:
one or more ultrasound sensors, or
one or more radar sensors.

9. The computer-implemented method of claim 1, wherein:
the one or more three-dimensional motions comprise one or more actions by a user; and
the one or more actions comprise at least one of:
the user manipulating the hand-held object,
the user moving the hand-held object,
the user repositioning the hand-held object, or
the user tilting the hand-held object.

10. The computer-implemented method of claim 1, wherein the one or more three-dimensional motions comprise one or more actions by a user wearing an article comprising the hand-held object.

11. The computer-implemented method of claim 1, wherein identifying the three-dimensional-human-gesture input comprises one or more of:
utilizing a stroke-recognition algorithm to analyze at least a portion of the two-dimensional data;
utilizing a character-recognition algorithm to analyze at least a portion of the two-dimensional data; or
utilizing a handwriting-recognition algorithm to analyze at least a portion of the two-dimensional data.

12. The computer-implemented method of claim 1, wherein:
the one or more computing devices comprise a first computing device and a second computing device;
the first computing device and the second computing device are physically distinct from one another;
the first computing device is a different type of computing device from the second computing device;
identifying the three-dimensional-human-gesture input comprises:
identifying, by the first computing device, the three-dimensional-human-gesture input, and
identifying, by the second computing device, the three-dimensional-human-gesture input; and
the method comprises:
responsive to the first computing device identifying the three-dimensional-human-gesture input:
identifying, by the first computing device, one or more functions associated with the first computing device that are associated with the three-dimensional-human-gesture input, and
invoking, by the first computing device, the one or more functions associated with the first computing device; and
responsive to the second computing device identifying the three-dimensional-human-gesture input:
identifying, by the second computing device, one or more functions associated with the second computing device that are associated with the three-dimensional-human-gesture input, and
invoking, by the second computing device, the one or more functions associated with the second computing device, the one or more functions associated with the first computing device being different from the one or more functions associated with the second computing device.

13. The computer-implemented method of claim 1, wherein:
the one or more computing devices comprise a first computing device and a second computing device;

the first computing device and the second computing device are physically distinct from one another;

the first computing device is a different type of computing device from the second computing device;

the one or more three-dimensional motions comprise an additional three-dimensional-human-gesture input;

identifying the three-dimensional-human-gesture input comprises identifying, by the first computing device, the three-dimensional-human-gesture input; and the method comprises:
identifying, by the second computing device and based at least in part on the two-dimensional data, the additional three-dimensional-human-gesture input;
responsive to the first computing device identifying the three-dimensional-human-gesture input:
identifying, by the first computing device, one or more functions associated with the first computing device that are associated with the three-dimensional-human-gesture input, and
invoking, by the first computing device, the one or more functions associated with the first computing device; and
responsive to the second computing device identifying the additional three-dimensional-human-gesture input:
identifying, by the second computing device, one or more functions associated with the second computing device that are associated with the additional three-dimensional-human-gesture input, and
invoking, by the second computing device, the one or more functions associated with the second computing device, the one or more functions associated with the first computing device being different from the one or more functions associated with the second computing device.

14. A system comprising:
a hand-held object comprising one or more inertial measurement sensors, one or more processors, and a memory storing instructions that when executed by the one or more processors cause the first computing device to perform operations comprising:
generating, by the one or more inertial measurement sensors, three-dimensional data describing one or more three-dimensional motions comprising a three-dimensional-human-gesture input;
generating, based at least in part on the three-dimensional data describing one or more three-dimensional motions, two-dimensional data at least partially describing at least one motion of the one or more three-dimensional motions; and
transmitting the two-dimensional data from the hand-held object to a computing device remote from the hand-held object; and
the computing device comprising one or more processors and a memory storing instructions that when executed by the one or more processors of the computing device cause the computing device to perform operations comprising identifying, based at least in part on the two-dimensional data, a three-dimensional-human-gesture input within the one or more three-dimensional motions.

15. One or more non-transitory computer-readable media comprising instructions that when executed by a hand-held object comprising one or more processors cause the hand-held object to perform operations comprising:
generating, by one or more inertial measurement sensors of the hand-held object, three-dimensional data describing one or more three-dimensional motions comprising a three-dimensional-human-gesture input;
generating, by the hand-held object and based at least in part on the three-dimensional data describing the one or more three-dimensional motions, two-dimensional data at least partially describing at least one motion of the one or more three-dimensional motions;
transmitting the two-dimensional data from the hand-held object to one or more computing devices remote from the hand-held object; and
identifying, by the one or more computing devices and based at least in part on the two-dimensional data, the three-dimensional-human-gesture input, wherein identifying the three-dimensional-human-gesture input comprises:
identifying, based at least in part on the two-dimensional data and one or more two-dimensional-movement-recognition models, a two-dimensional movement; and
identifying, based at least in part on the two-dimensional movement, the three-dimensional-human-gesture input.

* * * * *